May 15, 1923.

W. H. S. BREWER 1,455,070

KETTLE LID RAISING MEANS

Filed July 24, 1920

Inventor:
William Herbert Simpson Brewer
By
att.

Patented May 15, 1923.

1,455,070

UNITED STATES PATENT OFFICE.

WILLIAM HERBERT SIMPSON BREWER, OF EPSOM, NEW ZEALAND.

KETTLE-LID-RAISING MEANS.

Application filed July 24, 1920. Serial No. 398,806.

*To all whom it may concern:*

Be it known that I, WILLIAM HERBERT SIMPSON BREWER, subject of the King of Great Britain, residing at Epsom, Auckland, in the Dominion of New Zealand, have invented a new and useful Improved Kettle-Lid-Raising Means; and I do hereby declare the following to be a full, clear, and exact description of the same.

This invention has been devised with the object of providing means whereby a kettle lid may be raised, and held in the raised position, in order to permit of the kettle being filled. These means are adapted to provide against any liability of steam rising through the lid opening, coming in contact with the hand of the person raising such lid. They are also of such a nature that when used to raise a lid, the lid will act as a shield to protect the hand from the rising steam.

The invention consists in the combination with the kettle lid of a bar or link that is attached to or connected to the lid at one of its ends and the other end of which is connected to or made with an eye that loosely encircles the kettle handle. This bar or link is made of such a length that it assumes a vertical position projecting upward from the lid centre, when the lid is in position, and when its upper end is moved along the handle, it will cause the lid to be turned up and raised on one side, while resting on the edge of the kettle opening at the other side.

The invention is illustrated as to two ways by which it may be carried out, in the accompanying drawings in which:—

Figure 1:
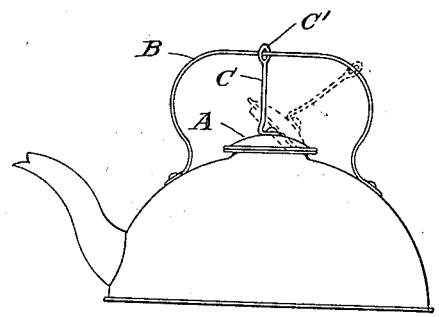
Figure 1 is an elevation of a kettle showing one form of the invention in position thereon.
Figure 2:
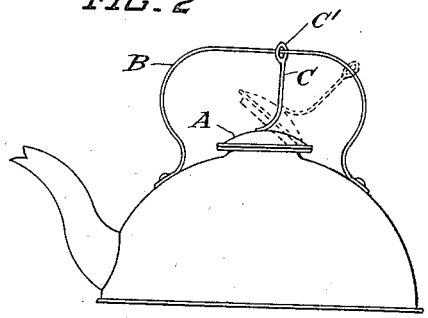
Figure 2 is a similar view but illustrating the second form of the invention.

A is the kettle lid of any of the ordinary forms. B is the handle which may be hinged or rigid in the form of the invention shewn in Figure 1, but which is rigid in the form shewn in Figure 2. C is the bar or link connecting the lid with the handle. This is formed with the eye C' on one end that loosely encircles the handle B. At its other end it is connected to the lid.

It will be apparent, that with the bar or link C made of the proper length, the kettle handle may be grasped by the hand and the upper end of the bar or link slid back along the handle, thereby causing the lid A to be tilted up in the manner shewn by dotted lines in the drawings. When the lid is in this position, the kettle may be filled by placing the opening beneath a tap. At the same time the lid itself will act as a shield to protect the hand from any rising steam.

I claim:—

The combination of a kettle having an opening in the top, a substantially inverted U-shaped handle rigidly secured to the kettle, a lid loosely mounted in the opening, a rod rigidly attached at one end to the lid and provided at its opposite end with an eye loosely encircling the handle.

In testimony whereof, I have signed this specification in the presence of two subscribing witnesses.

WILLIAM HERBERT SIMPSON BREWER.

Witnesses:
DAVID BROWN HUSTON,
JOSEPH STANLEIGH McAVEN.